J. H. ALGARD & A. BRAMER.
FRAME FOR GANG PLOWS.
APPLICATION FILED JAN. 31, 1910.
997,355.
Patented July 11, 1911.
2 SHEETS—SHEET 2.
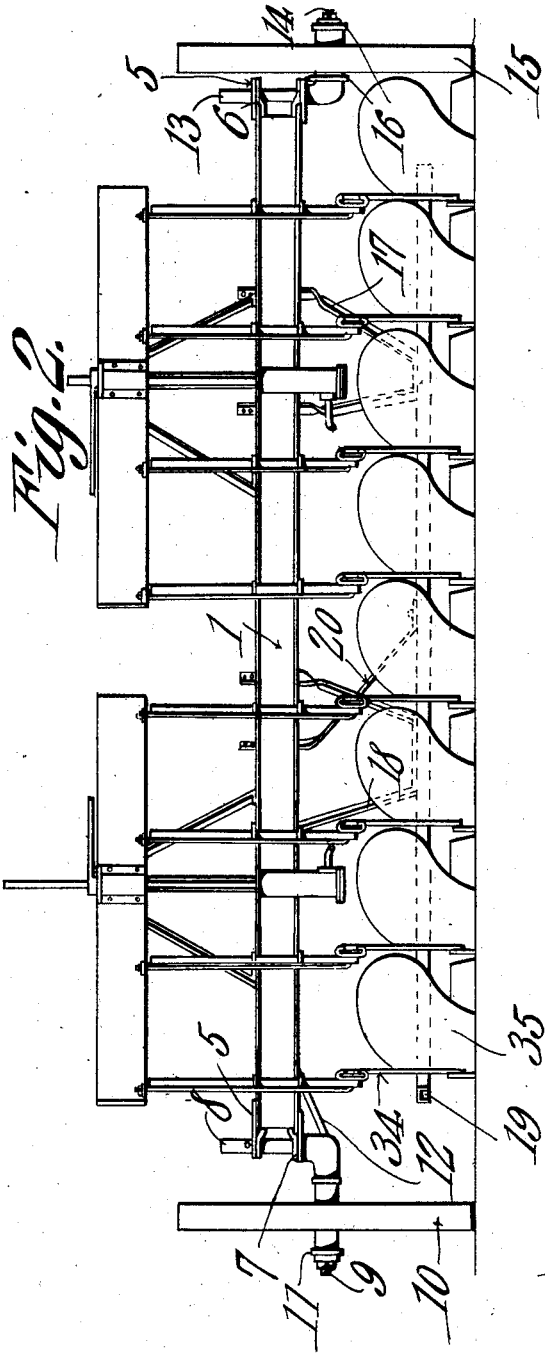
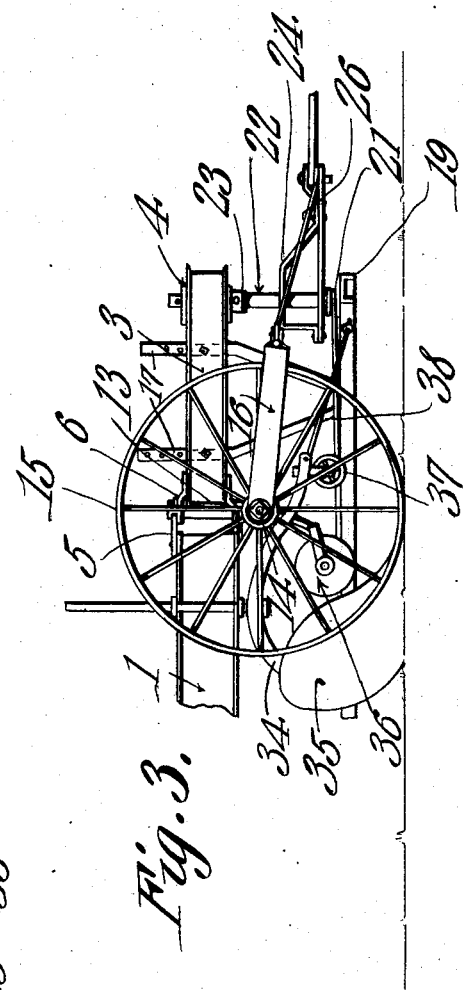
James H. Algard AND
Albert Bramer
Inventors
Witnesses
By C. A. Snow & Co.
Attorneys

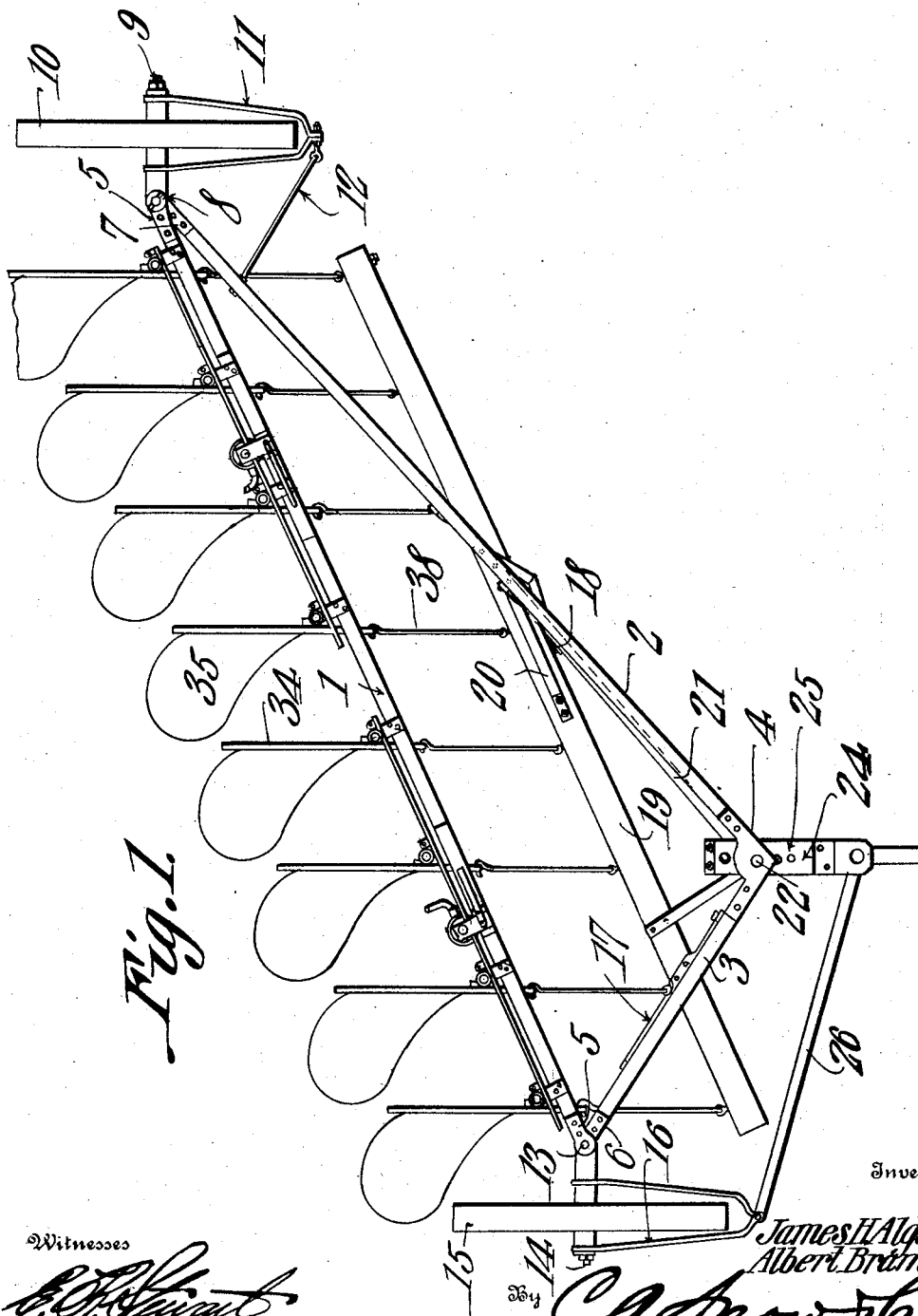

UNITED STATES PATENT OFFICE.

JAMES H. ALGARD AND ALBERT BRAMER, OF WATERTOWN, SOUTH DAKOTA.

FRAME FOR GANG-PLOWS.

997,355. Specification of Letters Patent. Patented July 11, 1911.

Application filed January 31, 1910. Serial No. 541,074.

*To all whom it may concern:*

Be it known that we, JAMES H. ALGARD and ALBERT BRAMER, citizens of the United States, residing at Watertown, in the county of Codington and State of South Dakota, have invented a new and useful Frame for Gang-Plows, of which the following is a specification.

This invention has relation to frames for gang plows and it consists in the novel construction and arrangement of its parts as hereinafter shown and described.

The object of the invention is to provide in a frame as indicated a dirigible supporting wheel with guiding means connecting the said wheel with the coupling whereby the frame is connected with a traction or other form of engine. By this arrangement when the frame is being turned and the coupling which is pivotally attached to the frame is swung the means connecting the said coupling with the dirigible wheel will swing the said wheel horizontally which will materially facilitate the turning of the frame.

In the accompanying drawings:—Figure 1 is a top plan view of the frame with a gang of plows connected thereto. Fig. 2 is a rear elevation of the same. Fig. 3 is an end view of a portion of the same.

The upper portion of the frame is triangular in form and consists of a relatively long rear beam 1 and shorter forward beams 2 and 3. The beams 2 and 3 are joined together at their adjacent ends by means of plates 4 which are applied to the upper and lower edges of the said beams. Perforated lugs or ears 5 are fixed to the upper and lower sides of the end portions of the beam 1 and project beyond the ends of the said beam. The beam 3 is provided at its rear end with ears 6 which are also perforated and which lie between the ears 5 at the forward end of the beam 1. The beam 2 is provided at its rear end with perforated ears 7 which lie between the ears 5 at the rear end of the beam 1. A shaft 8 is journaled in the perforations of the ears 7 and the ears 5 located at the rear end of the beam 1 and at its lower portion is continued into an outwardly disposed spindle 9 upon which is journaled a ground wheel 10. A yoke 11 is connected at its ends with the spindle 9 and the intermediate portion of the said yoke lies in front of the forward portion of the periphery of the wheel 10. A link 12 is connected at its outer portion with the forward end of the yoke 11 and at its inner portion to the rear portion of the beam 2. The said link 12 serves as means for holding the yoke 11 in a desired position with relation to the frame of which the beams 1, 2 and 3 form component parts.

A shaft 13 is journaled in the perforations of the ears 6 and ears 5 at the forward end of the beam 1 and the lower portion of the said shaft 13 is continued into an outwardly disposed spindle 14 upon which is journaled a ground wheel 15. The yoke 16 is connected at its ends with the spindle 14 and the intermediate portion of the said link yoke lies in front of the forward portion of the periphery of the wheel 15.

Approximately U-shaped standards 17 and 18 are adjustably connected at their end portions to the beams 3 and 2 respectively and at their intermediate portions the said standards 17 and 18 are connected with a horizontal beam 19 which lies under the beams 2 and 3. A brace 20 is adjustably connected at its upper end with the beam 2 and at its lower end is fixed to the intermediate portion of the beam 19. A bent angle bar 21 is connected at its ends to the beam 19 in the vicinity of the standards 17 and 18 and the pointed portion of the bar 21 lies below the point formed at the adjacent ends of the beams 2 and 3. A pin 22 is supported at its lower end upon the angle bar 21 and the upper portion of the said pin passes through the plate 4 which connects with the adjacent ends of the beams 2 and 3. The pin 22 is held against upward movement with relation to the plate 4 by means of an adjustable collar 23 which is mounted upon the said pin and bears against the under surface of the lower plate 4. A coupling 24 is provided with a series of perforations 25 any one of which is adapted to receive the intermediate portion of the pin 22 whereby the said coupling may be adjustably connected with the said pin. A link 26 is pivotally connected at one end with the intermediate portion of the yoke 16 and at its other end with the forward portion of the coupling 24. The coupling 24 is adapted to be attached to the frame of a traction engine or other power machine used for drawing the frame.

Plow beams 34 are provided and each carries a suitable plow share 35. Each beam 34 is further provided with a suitable colter 36 and gage wheel 37. Links 38 connect the forward ends of the beams 34 with the beam 19 and the said links at their attaching points with the beam 19 are spaced at regular intervals apart.

Having described the invention, what we claim as new and desire to secure by Letters Patent is:—

1. A plow comprising a triangular frame, supporting wheels for the frame, one of said wheels being dirigible, a beam located under the frame, a coupling located between the beam and the frame and pivotally connected with both and distributing the draft strain between the frame and beam, means operatively connecting said coupling with the dirigible supporting wheel and furrow openers connected with the beam.

2. A plow comprising a triangular frame, supporting wheels for the frame, one of said wheels being dirigible, a beam located below the frame and adjustably connected with the same, a coupling located between the frame and the beam and pivotally connected with both and distributing the draft strain between the frame and beam, means operatively connecting said coupling with the dirigible wheel and a series of furrow openers connected with the beam.

3. A plow comprising a triangular frame, supporting wheels for said frame, one of said wheels being dirigible, a beam located below the frame and adjustably connected with the same, a coupling located between the frame and beam and pivotally and adjustably connected with both and distributing the draft strain between the frame and beam, a link connecting said coupling with the dirigible supporting wheel and a series of furrow openers connected with the beam.

In testimony that we claim the foregoing as our own, we have hereto affixed our signatures in the presence of two witnesses.

JAMES H. ALGARD.
ALBERT BRAMER.

Witnesses:
O. J. OPHEIM,
N. M. SCHOENBERGER.

---

Copies of this patent may be obtained for five cents each, by addressing the "Commissioner of Patents, Washington, D. C."